Figure 1:
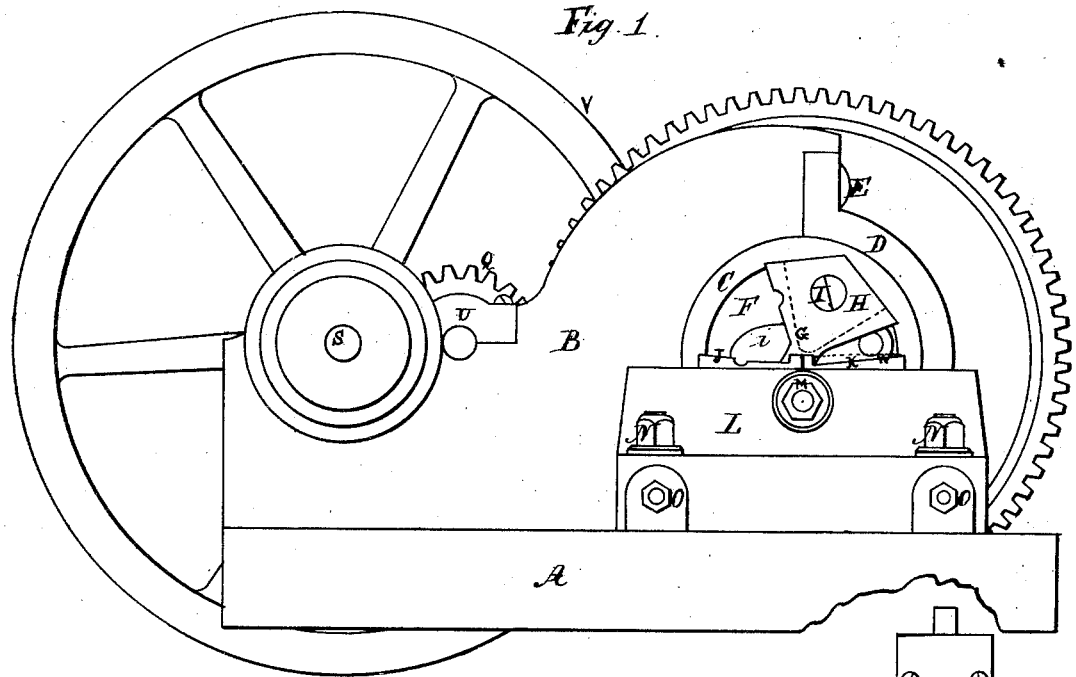

S. Hall.
Shearing Metal.

Nº 18,811. Patented Dec. 8, 1857.

THE GRAPHIC CO. PHOTO-LITH. 39 & 41 PARK PLACE, N.Y.

UNITED STATES PATENT OFFICE.

SAMUEL HALL, OF NEW YORK, N. Y.

MACHINE FOR CUTTING METALLIC BARS.

Specification of Letters Patent No. 18,811, dated December 8, 1857.

*To all whom it may concern:*

Be it known that I, SAMUEL HALL, of the city, county, and State of New York, have invented a new and useful Machine for Cutting Bar-Iron With Rotating and Stationary Shear-Blades; and I do hereby declare that the same is described and represented in the following specifications and drawings.

To enable others skilled in the art to make and use my invention, I will proceed to describe its construction and operation, referring to the drawings in which the same letters indicate like parts in each of the figures.

Figure 2:
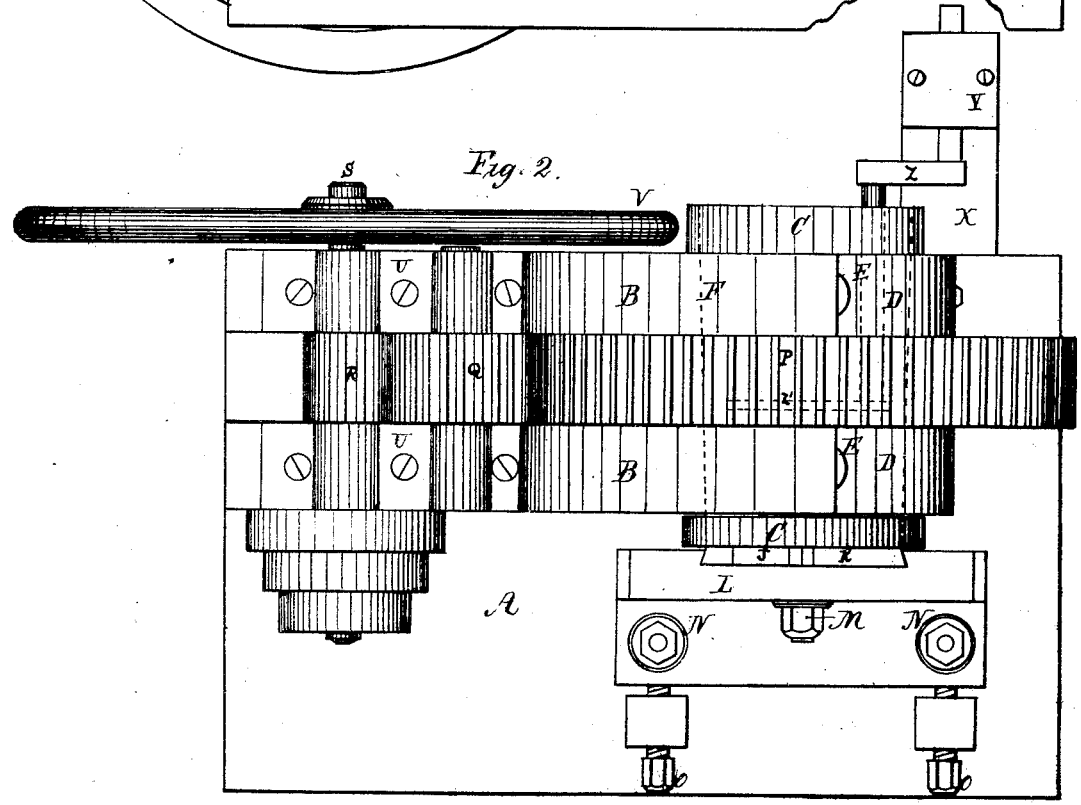

Figure 1 is an elevation of the machine. Fig. 2 is a plan.

The nature of my invention consists in affixing a shear blade or blades to the end of a cylinder which is rotated, so as to operate the blades affixed to it, to cut bars of iron and other metal in connection with stationary shear blades arranged in combination with them.

In the accompanying drawings A is the bedplate of the machine made of cast iron and provided with two flanges or projections B, B, which are made in a proper form to receive the journals of the cylinder C which is fitted to turn freely in them and confined in its appropriate bearings by the caps D, D, fastened by the screws E, E, in the usual manner as otherwise. The interior or opening F in the cylinder C is made conical or largest at the rear end as represented by dotted lines in Fig. 2, so that the pieces of metal which are cut off and fall in the cylinder will work out at the rear end as it is rotated.

There are two projections on the inside of the cylinder C, one of which is shown by dotted lines in Fig. 1 at G, it is covered by one end of the shear blade H, which is dovetailed into the end of the cylinder C, as represented, and fastened by the screw I, which passes through it and screws into the projection so as to secure the shear blade firmly in its proper place; the opposite end of the shear blade being made in the same form and fastened in the same way. The shear blade H is made double edged so as to cut each way as the cylinder is turned in either direction, the right hand edge is shown as made to cut off flat, as square bars of iron, the left hand is made to cut off round bars; the edges of the stationary shear blades J and K are made to act in connection with H, and formed accordingly. One end of each of the shear blades J and K are made dovetailing, as shown in Fig. 2, to fit a recess in the block L, so that when they are placed in the block they may be fastened by the bolt M which has a head fitted to recesses made in the ends of the cutters for that purpose.

The block L is made with a broad base to rest on the bed plate A, provided with slots for the bolts N, N, which fasten the block to the bedplate, which is provided with two lugs which are perforated by the screws O, O, arranged to adjust the stationary blades to the rotating blade as may be required, and to prevent them from being pushed or pressed off in the act of cutting. The gear P, may be cast with the cylinder C, or firmly fastened to it so as to turn between the projections B, B, and operate the cylinder. This gear is acted upon by the gear Q, which is acted on by the pinion R, on the shaft S, which is provided with a series of pulleys T, to which a band may be applied from the power which is to operate the machine. The shaft S, turns in the projections B, B, and the shaft of the gear Q, does also, both shafts being secured by the caps U, U, fastened to the projections B, B. By placing the gear Q, between the gear P, and pinion R, I am enabled to make the fly wheel V, on the shaft of the pinion R, larger than I could otherwise do, without having it come across the opening in the cylinder C so as to be in the way of the pieces cut off as they work out of the cylinder.

The blades H, J, and K are so constructed and arranged as to begin to cut a flat bar of metal farthest from the center of the cylinder and to finish cutting it nearer or nearest to the center of the cylinder, see the dotted line W, Fig. 1, which shows the edge of H just in contact with K, at the extremity.

In order to cut the pieces of metal of a uniform and proper length the bar X may be made to slide under the bed plate A, and provided with a standard Y, to hold the bar Z, which is made in the form represented and extends into the cylinder C, as shown by dotted lines in Fig. 2, which bar Z, has the plate Z' fastened to its inner end so that the bars being cut may be pushed in across the blades J, or K, against the plate Z', and cut the length desired by adjusting the bar Z so as to hold the plate a proper distance from the blades.

I believe I have described the construction, operation, and use of my invention, so as to enable any person skilled in the art to make and use it. I will now specify what I desire to secure by Letters Patent, to wit:

I claim—

The employment of one or more revolving shear blades fastened to the end or face of a revolving hollow cylinder as described, in combination with a stationary shear blade or blades for the purpose herein described.

SAMUEL HALL.

Witnesses:
I. DENNIS, Jr.,
JOHN S. HOLLINGSHEAD.